Aug. 13, 1935.  E. L. KRAFT  2,011,057
AUTOMOBILE WINDSHIELD CONTROL MECHANISM
Filed Dec. 2, 1931  3 Sheets-Sheet 1

Inventor
Edward L. Kraft
By Bacon & Thomas
Attorneys

Aug. 13, 1935.   E. L. KRAFT   2,011,057
AUTOMOBILE WINDSHIELD CONTROL MECHANISM
Filed Dec. 2, 1931   3 Sheets-Sheet 2

Inventor
Edward L. Kraft
By Bacon & Thomas
Attorneys

Aug. 13, 1935. E. L. KRAFT 2,011,057
AUTOMOBILE WINDSHIELD CONTROL MECHANISM
Filed Dec. 2, 1931 3 Sheets-Sheet 3

Edward L. Kraft, Inventor

By Bacon & Thomas
Attorney

Patented Aug. 13, 1935

2,011,057

UNITED STATES PATENT OFFICE 2,011,057

AUTOMOBILE WINDSHIELD CONTROL MECHANISM

Edward L. Kraft, York, Pa., assignor to Martin-Parry Corporation, York, Pa., a corporation of Delaware Application December 2, 1931, Serial No. 578,559

1 Claim. (Cl. 296—84)

This invention relates to controlling mechanism for automobile windshields.

An object of the invention is to provide a power operated mechanism having means for swinging the shield according to the desire of the operator.

More specifically the invention comprehends the employment of an electrical motor, conveniently located under the cowl of the vehicle and preferably connected with the car battery, provided with a two-point switch situated on the dash with desirable indicia for the operator.

Subordinate features of the invention comprehend the employment of a casing secured within the rabbeted portion of the windshield posts or pillars for receiving a reciprocating nut actuated by a worm shaft mounted therein, which worm shaft is in turn driven by the said electrical motor.

Figure 1:
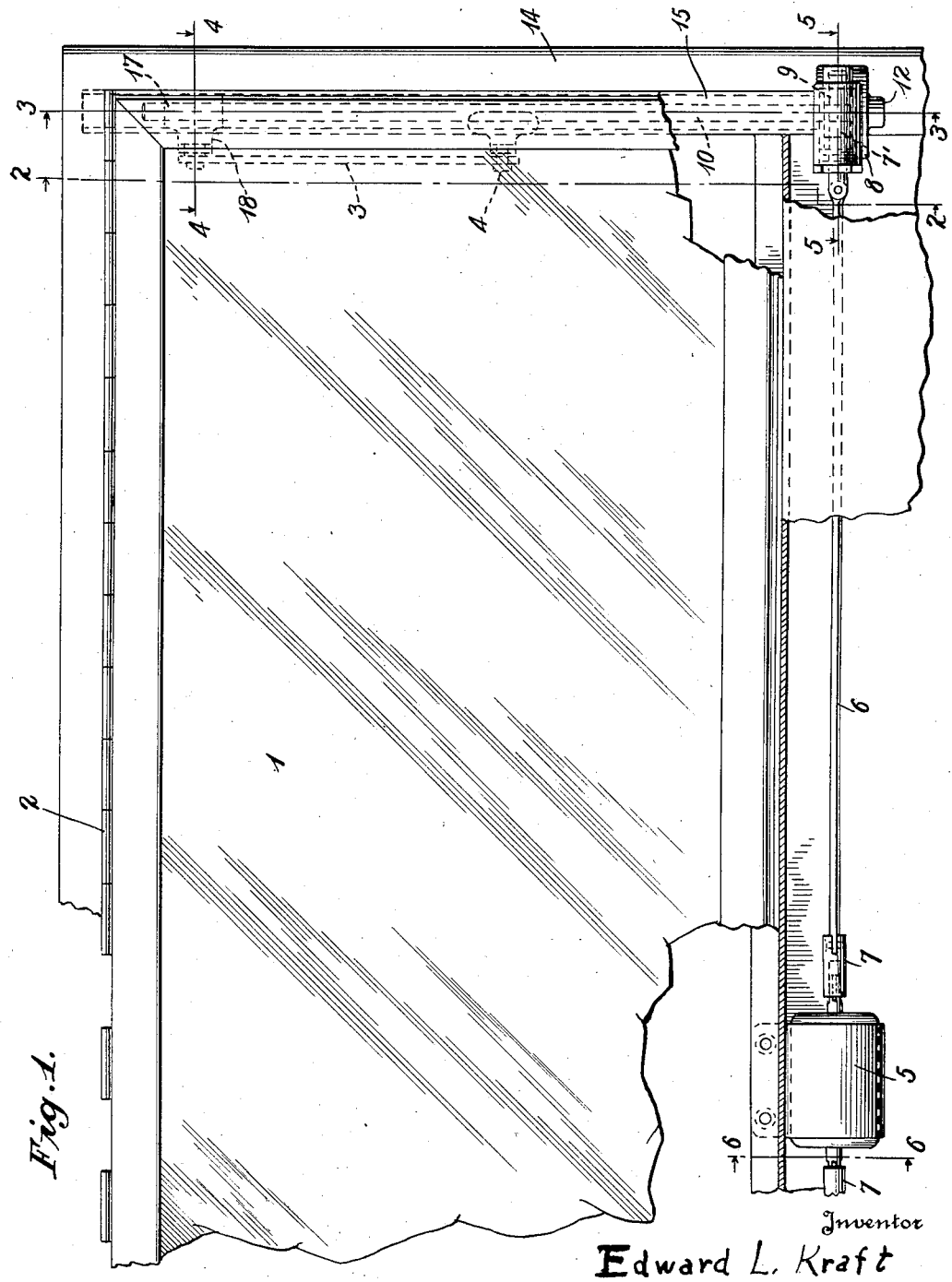
Figure 2:
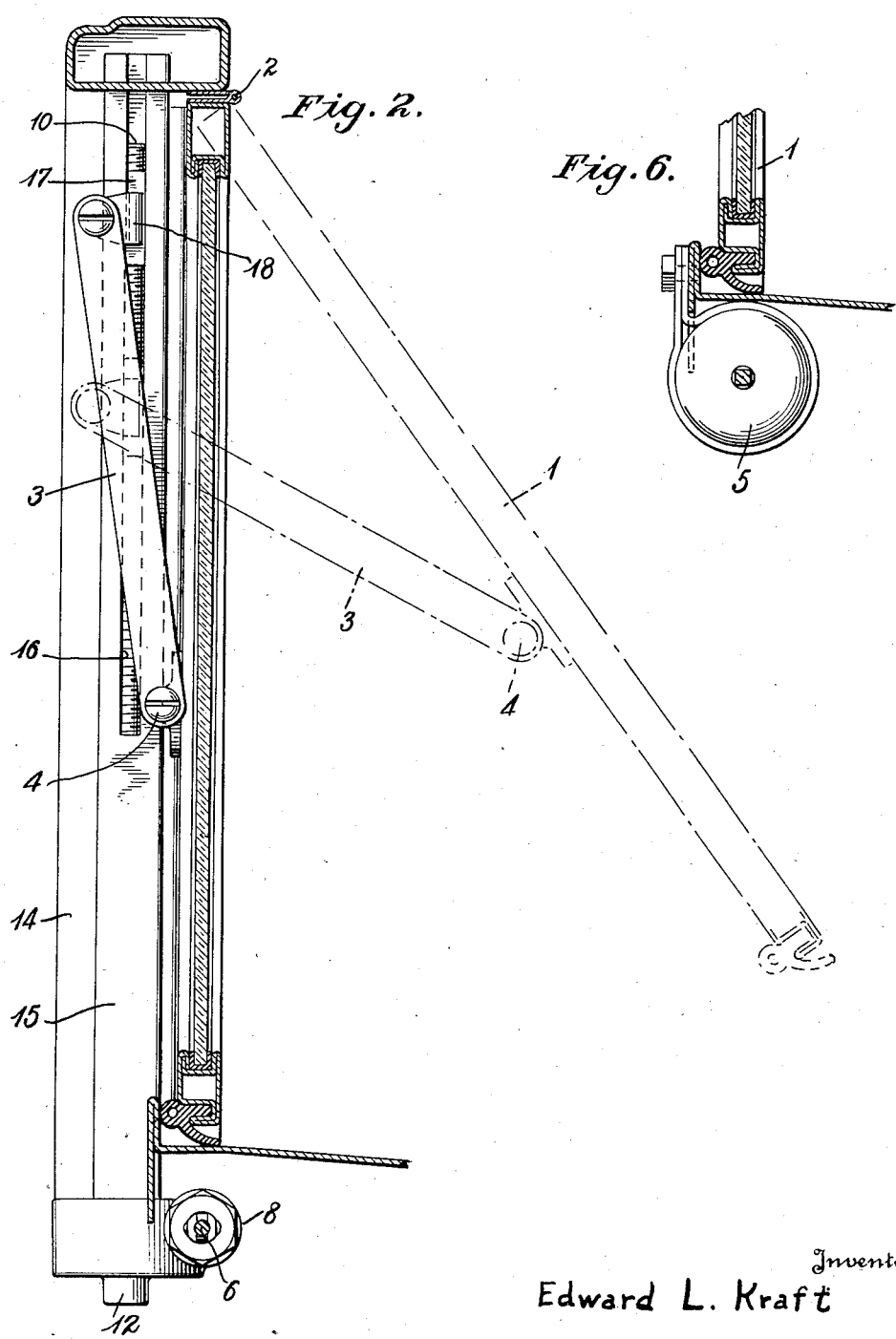
Figure 3:
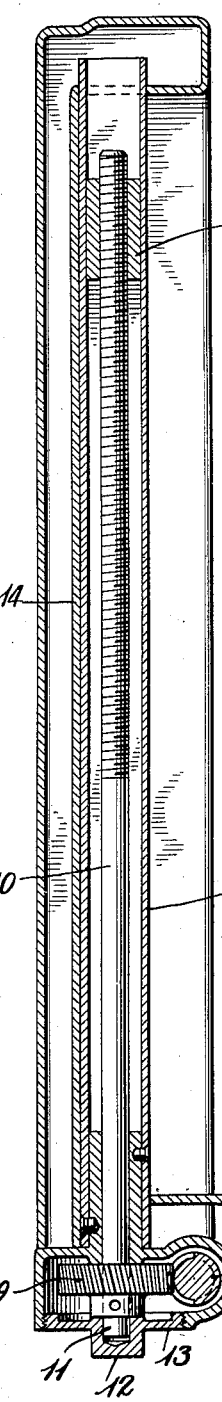
Figure 4:
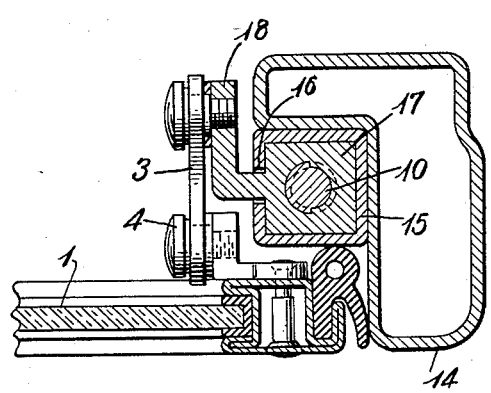
Figure 5:
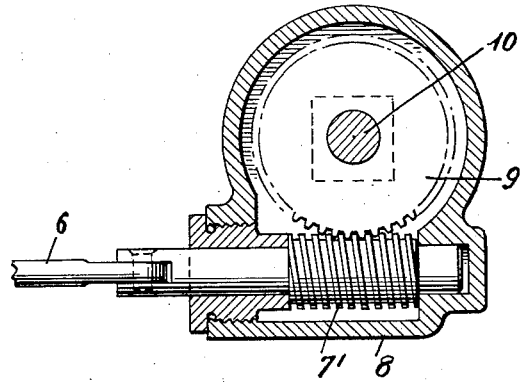

In the drawings, Figure 1 represents a fragmentary front elevation of a windshield, showing the operating mechanism associated therewith, Fig. 2 is a sectional view on the line 2—2 of Fig. 1, Fig. 3 is a sectional view on the line 3—3 of Fig. 1, Fig. 4 is a sectional view on the line 4—4 of Fig. 1, Fig. 5 is a sectional view on the line 5—5 of Fig. 1, and Fig. 6 is a sectional view on the line 6—6 of Fig. 1.

Referring now particularly to the drawings, wherein like reference characters represent similar parts, 1 is a swinging windshield hinged to the windshield frame as at 2 and adapted for outward swinging movement relative thereto. The windshield is provided with one or more arms 3 pivoted thereto as at 4.

Conveniently located within the cowl is an electric motor 5 which is preferably a six-volt motor operated from the car battery and provided with a two-point switch on the automobile dash with indicia such as "Up", "Off" and "Down" positions. The motor is preferably a double field motor. This motor has a shaft 6 coupled thereto by the coupling 7 and is preferably positioned substantially centrally of the windshield frame. If desired, two operating connections from the motor may be employed, one for actuating the brace link on one side of the shield and the other on the other side of the shield, but to simplify the description of the invention, only one connection is being described in detail. The rotary driving shaft 6 is provided with a worm 7' at its outer end which fits within the casing 8 as shown. This worm meshes with a larger worm 9 rigidly secured to the rotating lifting shaft 10. The lifting shaft has a terminal portion 11 journaled in the bearing 12 provided by the closure 13 as shown. The casting is sufficiently large to enclose the worms aforesaid but, as shown, the closure may be unthreaded from the casting if desired for the purpose of withdrawing the parts for cleaning or repair.

On the inside of the rabbeted pillars 14 I provide a casing 15 which is preferably welded thereto. This casing has an elongated vertical slot 16. Threaded to the lifting screw shaft 10 is a travelling nut 17 preferably rectangular in cross section and tightly fitting but slidably associated with the casing 15. This nut has a bell crank arm 18 passing through the slot and thence inwardly with respect to the shield as shown. The nut in its travelling movement is prevented from rotating relatively to the casing in view of the similar cross section configurations of the nut and the casing respectively.

The operation of the construction is as follows: if it is desired to lift the shield, the switch on the dash is turned, which causes a rotation of the rotary driving shaft 6 causing the worm 7' to mesh with the worm 9 secured to the rotating lifting jack 10. The rotating lifting jack, vertically disposed within the confines of the casing 15, threadedly engages the travelling nut 17 and causes the same to lift upwardly during the opening movement of the construction. The link 3, being pivoted to the rearward extension of the bell crank 18, is caused to move in accordance with the travelling movements of the nut and adjusts the windshield to any desired position. The switch is then turned off and the shield is maintained at its position of adjustment. If it is desired to lower, the operation is the same, the switch causing a reverse operation of the rotary driving shaft and the lifting shaft respectively.

The casing, lifting shaft and nut respectively are all conveniently located within the recess of the pillar and the device is quite sightly. Moreover, the motor is located under the cowl so that there are no exposed instrumentalities provided by the apparatus. When desired to remove for repair or cleaning purposes, the closure 13 is simply unscrewed and, the opening being larger than the worm 9, the entire assemblage may be conveniently withdrawn. For this purpose the link 3 is unfastened from the bell crank by suitable screws.

What I claim is:

In a motor vehicle construction, in combination, a windshield frame having vertical rabbeted pillars, a windshield hingedly mounted for swinging movement with respect to said frame and having its edge portions received in rabbets of said pillars when closed, mechanism for adjusting the position of the shield, said mechanism comprising an electric motor and a shaft horizontally disposed with respect to the frame and actuated by said motor, a worm secured to said shaft, a vertical lifting shaft having a worm cooperating with the first mentioned worm whereby to impart rotary movement to the lifting shaft, a casing for receiving the lifting shaft secured in the rabbet formation of one of the windshield pillars and to be engaged by the windshield when closed, a traveling nut of the same sectional shape as the casing positioned between the shaft and casing respectively and having a lateral extension, a slot within the casing for slidably receiving the extension provided by said traveling nut, a brace link pivoted to the said lateral extension at one end and pivoted at its other end to the windshield sash at a point substantially below the windshield hinge whereby vertical movement of the nut, caused by the rotation of the lifting shaft, adjusts the windshield in accordance with the movements of the nut.

EDWARD L. KRAFT.